Figure 1:
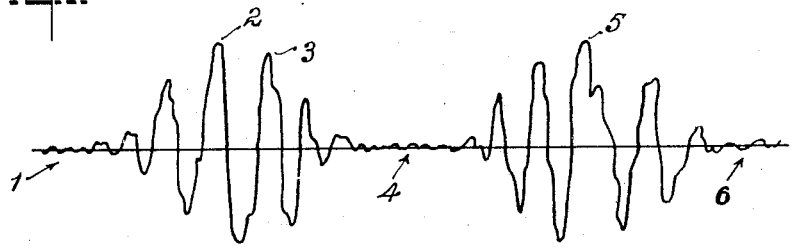

July 18, 1944.  A. N. GOLDSMITH  2,354,176
AUTOMATIC REVERBERATION CONTROL
Filed Dec. 21, 1942  4 Sheets-Sheet 1

FREQUENCY-RESPONSIVE-CIRCUIT OUTPUT

INVENTOR
ALFRED N. GOLDSMITH
BY H.S. Grover
ATTORNEY

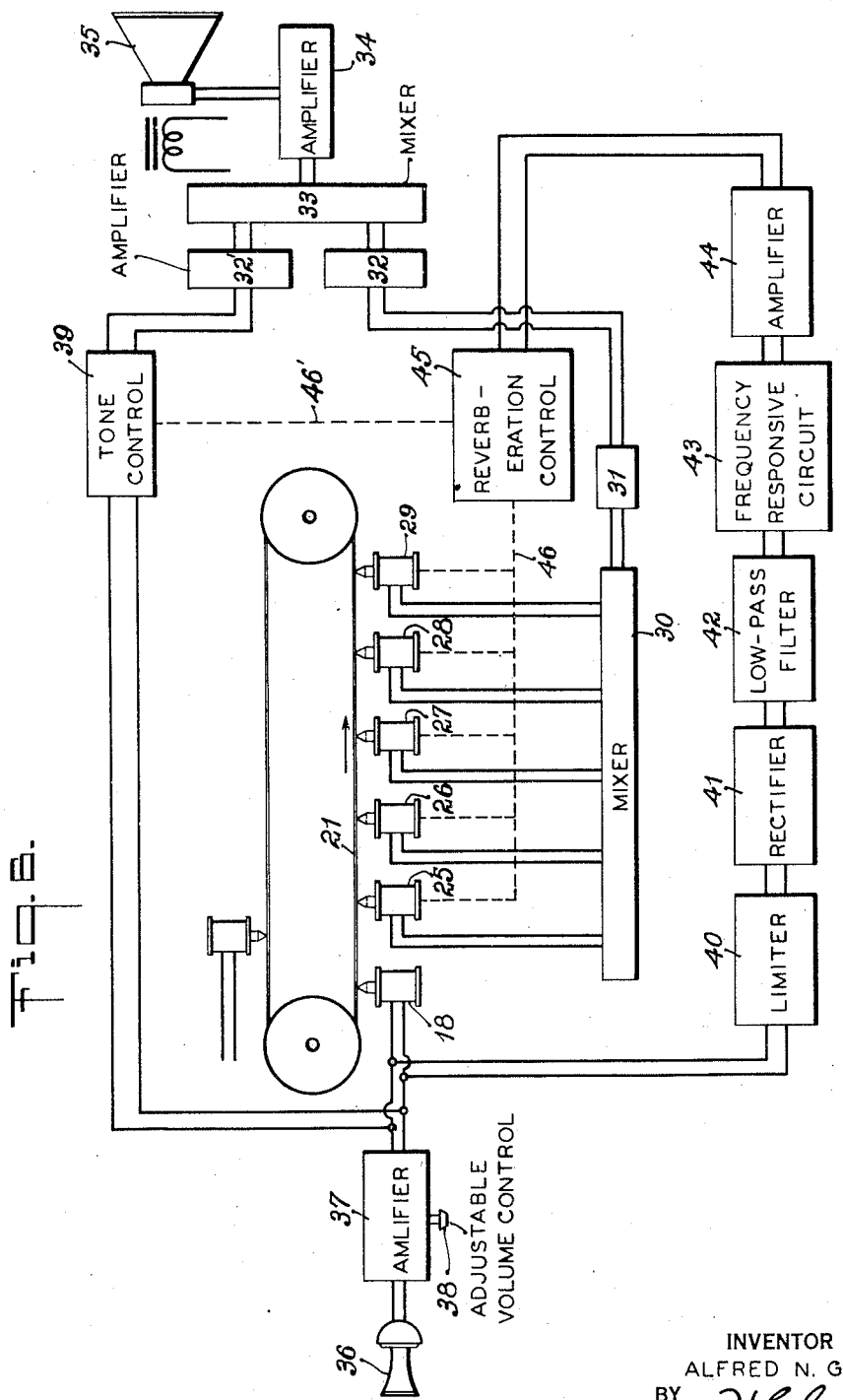

July 18, 1944. A. N. GOLDSMITH 2,354,176
AUTOMATIC REVERBERATION CONTROL
Filed Dec. 21, 1942 4 Sheets-Sheet 3
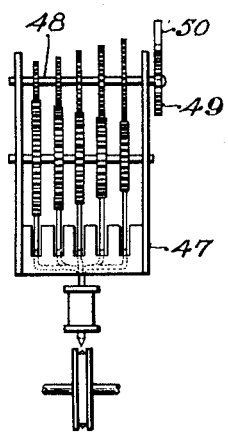
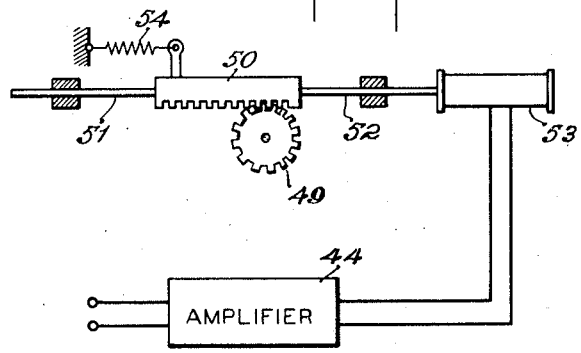
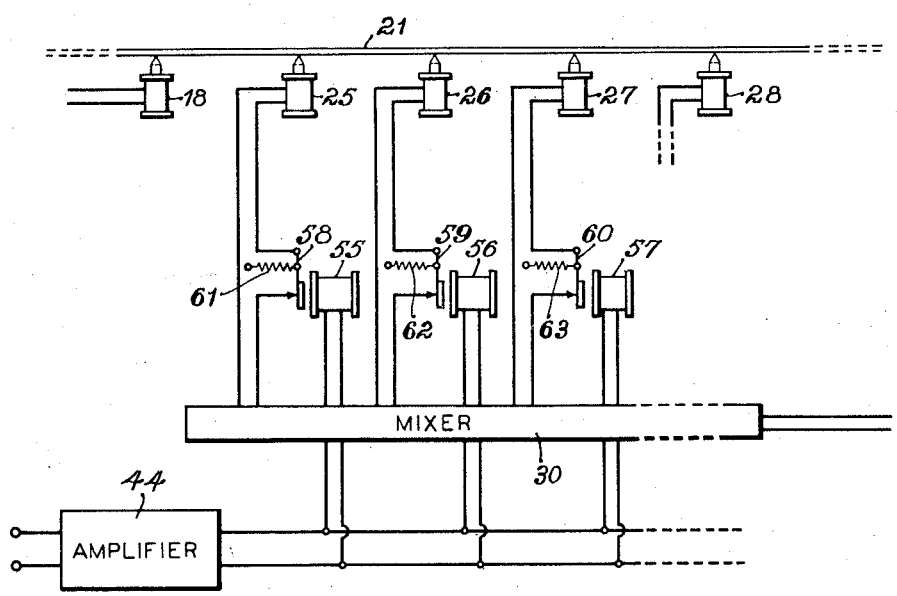
INVENTOR
ALFRED N. GOLDSMITH
BY
ATTORNEY July 18, 1944.  A. N. GOLDSMITH  2,354,176
AUTOMATIC REVERBERATION CONTROL
Filed Dec. 21, 1942  4 Sheets-Sheet 4

INVENTOR
ALFRED N. GOLDSMITH
BY H.C.Grover
ATTORNEY

Patented July 18, 1944

2,354,176

UNITED STATES PATENT OFFICE 2,354,176

AUTOMATIC REVERBERATION CONTROL

Alfred N. Goldsmith, New York, N. Y.

Application December 21, 1942, Serial No. 469,599

20 Claims. (Cl. 179—100.2)

My present invention relates to a method of and means for automatically controlling reverberation in the art of recording or reproduction of sound, whereby the apparent room acoustics are altered automatically in accordance with the tempo or rhythm of the musical selection involved or, for that matter, the spoken material which is to be picked up or reproduced. The method involves frequency-discrimination means and certain related means, all as described in the following, these means being operative on, and according to the tempo of, the acoustic material to be recorded or reproduced, the output of which means is used automatically to control a variable reverberation synthesizer of the type disclosed, for example, in my U. S. Patent No. 2,105,318 issued January 11, 1938, for "Synthetic reverberation system." As will be seen in the following, although the present invention is not restricted to this form of reverberation synthesizer, it is most readily and effectively applied thereto.

A study of the above-mentioned patent will sufficiently indicate the nature and importance of artificially synthesizing reverberation, whereby the acoustics of any particular enclosure (room, hall, tunnel, or the like) may be adequately simulated. The actual reverberation synthesizer corresponding to the above patent has been constructed and is an operative and satisfactory device. By means thereof, it has been found possible substantially instantaneously to change the apparent room acoustics from extremely "dead" (that is, corresponding to a very brief reverberation time) to very "live" (that is, highly reverberant, and corresponding to a long reverberation time), thereby avoiding objectionable effects obtained when a symphony orchestra or a church organ is playing in a small curtained room (i. e., no sonority) or when high-speed popular music is played in a large auditorium or in an enclosure having cathedral acoustic characteristics (i. e., blurring). Further, the nature of the wall reflections (as to their frequency characteristic) can be closely simulated, and the resulting synthesized reverberation has satisfied acoustic and musical experts as to its adequacy of simulation of the natural reverberation under the defined conditions.

It is well known in the broadcasting, motion-picture, and phonograph recording and reproducing arts that the most desirable reverberation time is widely different for different subject matter. Thus, for spoken material, a relatively brief reverberation time is usually desirable since intelligibility rather than sonority ("room resonance") is necessary for speech, as a general rule. On the other hand, even presto (extremely rapid) music of a "pizzicato" (that is, briefly durational, abrupt, or staccato) variety requires a somewhat longer reverberation time for best effect, as a general rule. As the musical tempo becomes slower toward largo (extremely slow and stately), the most desirable reverberation time increases. Indeed, for the impressive effect of organ music in a great cathedral, the reverberation time is approximately that actually found in such a structure, namely, a long period.

The recordist can manually adjust a reverberation synthesizer to adapt it to the type of recording or pick-up or reproduction which is involved, but there are limitations to manual skill and prolonged human attentiveness. Furthermore, the tempo changes even within one movement of a given selection, and should be carefully and promptly followed by a corresponding adjustment of the reverberation synthesizer, which procedure would impose a great burden on the recording personnel and introduce some uncertainty into the results. In case the reverberation synthesizer is applied to devices like radio receivers and home recorders which are to be used by relatively unskilled persons, or preferably are unattended and automatic in their action, it is also obvious that superior results will be obtained if automatic reverberation control is available. For the preceding reasons among others, I have devised the automatic reverberation control herein described.

The objects of this invention then include:

1. The pick-up of music or speech in a broadcast studio (and its transmission) with automatic control of the reverberation time for the most suitable effect.

2. The pick-up of music or speech in a motion-picture studio (and its recording) with automatic control of the most desirable reverberation time.

3. The pick-up of music or speech in a phonograph recording studio, and its recording, with the automatic control of the reverberation time for most effective results.

4. The reproduction of music or speech from a broadcast receiver with automatic control of the reverberation time most suited to the said subject matter being transmitted at the moment.

5. The reproduction of music or speech from a sound-film record in a theater or the like with automatic control of the reverberation time for best audience effect.

6. The reproduction of music or speech from a disc or other phonograph record, for example, in the home, with automatic reverberation control to produce intelligibility or sonority as desired for best effect.

7. The pick-up of speech or music by a public-address system, and its reproduction, with automatic control of the reverberation time for the desired effect.

Other applications and objects of the inventions will be evident to persons skilled in the acoustic arts. However, in addition to automatic control of the reverberation time, there are other automatic controls which may be associated therewith and which are comprised within this invention. Thus, when "presto" music, which is generally in the higher registers, is to be picked up, recorded, transmitted, or reproduced, it is also desired that there shall be automatic control of the quality of the individual echoes, which, in their totality, constitute the reverberation. That is, it is desirable in some such instance that the higher frequencies shall be more emphasized for the shorter reverberation times, and that the lower frequencies in the echoes shall be more stressed for the longer reverberation times. This also corresponds to the fact that in general such music as organ selections is heard in large enclosures where the room resonance or reverberation emphasizes the lower frequencies. As a further object of my invention there may therefore be included the following:

8. The automatic control of the quality of the original sound and its echoes constituting, in their totality, the reverberative effect, as to frequency characteristic, or any other musical or tonal characteristic, and in accordance with the dictates or needs of best reproduction or transmission or recording for a given tempo or rhythm of speech or music or both.

It will be clearly noted from the preceding that the automatic control of the frequency characteristic or response for even the original music (as well as its echoes), and in accordance with the tempo of the music, falls fully within the scope of my invention.

The method which I have devised for automatically realizing the above objects comprises broadly the following steps or their equivalent:

1. Deriving, from the original music (or speech), of the "tempo" or rhythm frequency (to be sharply distinguished from the frequency of the notes or tones of the music or speech).

2. Translation of the tempo frequency into control power or voltage by means of frequency-discriminative devices or circuits or the like.

3. Utilization of the control power or voltage for the automatic control of a reverberation synthesizer.

As stated above, the "tempo" frequency is something quite different from the frequency of the original notes of the music or speech. A note is an acoustic-energy group consisting of aerial vibrations of audible frequency. Tempo is related to the time between successive notes or tonal energy groups and is usually expressed in notes per minute. Tempo is always at an inaudible (subaudible) frequency. Tempo has as its effect the timing of the rhythmic recurrent emphasis in musical rendition.

For example, the first chord in the "Largo" from the "New World Symphony" by Dvorak has as its lowest note E-natural, two octaves below the E-natural just above the middle C of the piano. Thus, the lowest tonal frequency present in this chord is 80 cycles per second. The tempo, however, is 52 cycles per minute for a quarter note, with four-fourths time. Thus, even eighth notes will not be more frequent than 104 to the minute, or less than two to the second. For the first four bars of the "Largo," which are primarily half notes, the tempo frequency will be 26 to the minute, or less than one-half cycle per second. For the next seventeen bars, which have their emphasis on quarter notes, the tempo frequency will be predominantly 52 per minute or less than one cycle per second. Due to syncopation in some of these bars, an occasional eighth-note stress is found, corresponding to a tempo frequency of less than two cycles per second. Accordingly, by appropriate selection of the time constants of the electrical circuits involved herein, the reverberation control will function sufficiently speedily and accurately to reproduce even the individual bars of this selection with the apparent room acoustics best suited thereto.

The range of tempo frequencies between "largo" and "presto" ranges from a fraction of a cycle per second to a few cycles per second, and is not co-extensive with the range of tonal frequencies of the notes comprising musical selections or speech. It is this fact, among others, which enables the development of the automatic reverberation control herein described.

Figure 10:
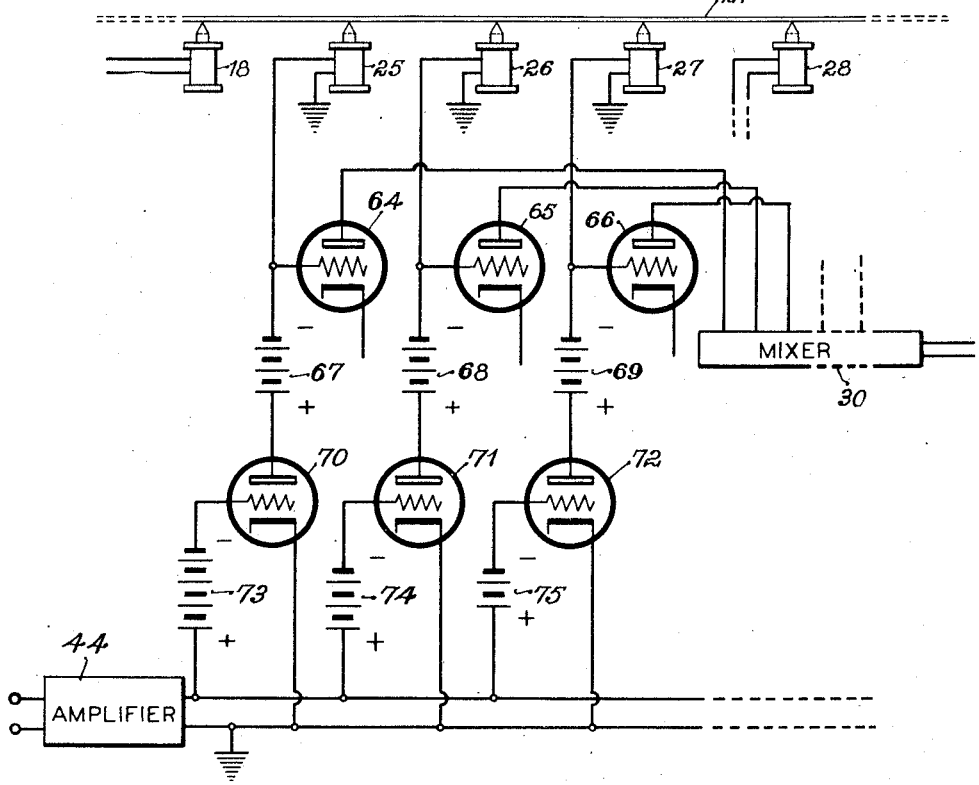
Figure 11:
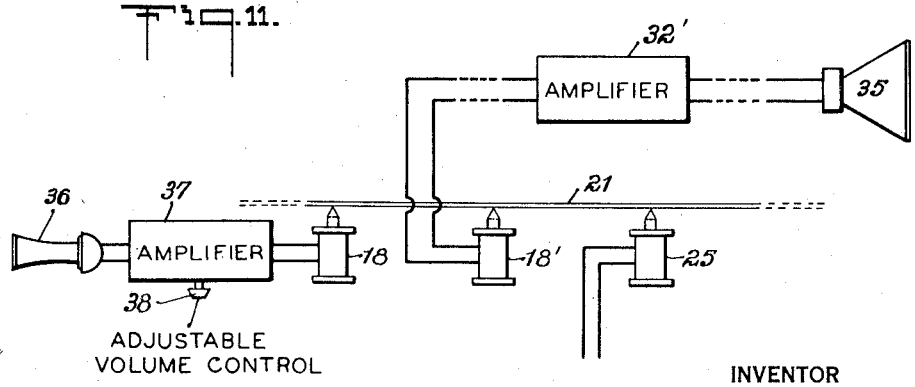

The novel features characteristic of my invention are set forth with particularity in the appended claims. The invention itself, however, both as to its organization and mode of operation together with further objects and advantages thereof, will best be understood by reference to the following description taken in connection with the accompanying drawings in which Figs. 1 through 5 illustrate by means of curves certain of the steps underlying the method of operation of the invention; Fig. 6 is a schematic assembly, in block diagram, of the complete equipment embodying the invention; Figs. 7 and 8 show one form of the invention employing electro-mechanical means for effecting automatic reverberation control; Fig. 9 shows another form employing relay-operated switches; Fig. 10 shows an embodiment of the invention employing electronic means; and Fig. 11 is a modification of Fig. 6 which may be employed to compensate for the time required to operate the reverberation synthesizer.

By way of preliminary explanation, there will be described briefly one way of carrying out the invention which includes the following steps:

1a. The original audio wave is passed through a limiter or automatic volume control or the equivalent. The purpose is to prevent changes in the loudness of the music in various parts of the selection from affecting the derivation of the correct tempo frequency.

1b. The limited audio wave obtained in 1a above is then rectified. The purpose is to produce electrical energy in a form from which the tempo frequency can be readily derived.

1c. The rectified wave of 1b above is then passed through a low-pass filter having an upper cut-off approximately below audibility. Such a filter, for example, would be one having an upper cut-off at 10 cycles per second; that is, passing in substantially unattenuated form all frequencies of ten cycles per second or less. The purpose of this step is to derive the actual tempo frequency.

2. The tempo-frequency wave from 1c above is then passed through a frequency-discriminative circuit or system, such circuit or system functioning over the range of tempo frequencies likely to be encountered in practice (that is, from a fraction of a cycle per second to several cycles per second). The purpose is to derive an output suitably related to the tempo frequency. This output is then amplified conventionally to the extent necessary to enable step 3 below.

3. The output control power from 2 above is used to control electro-mechanically, electronically, photo-electrically, or otherwise, the operation of a reverberation synthesizer (replacing in effect the manual controls thereof). This control power may control not only the reverberation time, but also the tonal quality (frequency characteristic) of the individual echoes (and, if desired, the original sound) comprising in their totality the reverberation, or any other desired musical characteristics which should be adjusted in accordance with the tempo of the music or speech.

Referring now more particularly to the drawings, there is shown in Fig. 1 a typical audio wave of music 1 to 6 consisting of successive tonal-energy groups. The low audio frequencies therein have the periodicity of 2 to 3, and the high audio frequencies (overtones) therein have the periodicity of the fine ripples at 1, 4 and 6, for example. The tempo frequency corresponds to the distance between 2 and 5, or between 1 and 4. The wave form is of course purely illustrative.

Figure 2:
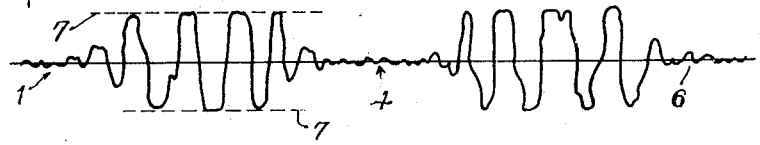

In Fig. 2 is shown the result of passing the wave of Fig. 1 through a limiter or automatic-volume-control system. The limited amplitude of the wave is shown by the dash lines 7.

Figure 3:
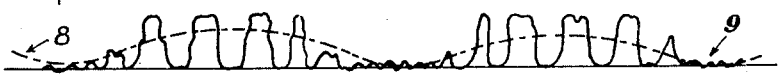

Fig. 3 shows the result of rectifying the wave which leaves the limiter as shown in Fig. 2. It will be seen that this wave shows a strong component of the tempo frequency, indicated as dot-dashed curve 8 to 9.

Figure 5:
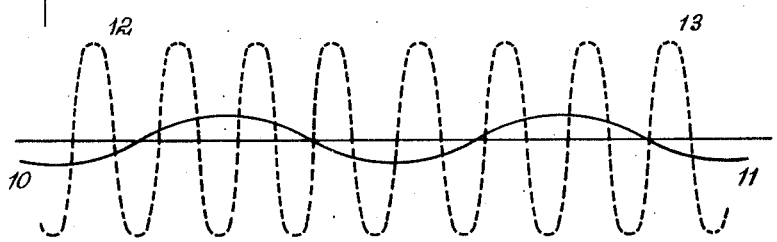

This same tempo-frequency curve is shown as the full line 10 to 11 in Fig. 5. It is illustratively taken to correspond to "largo," or slowest tempo. By way of contrast, there is also shown as a dashed curve 12 to 13 in Fig. 5 the corresponding tempo-frequency wave for "presto" music.

Figure 4:
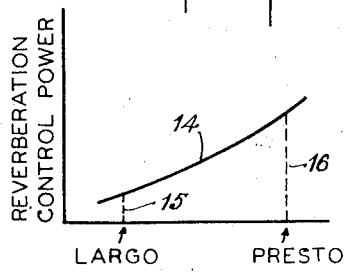

In Fig. 4 is shown the output of control power or voltage for the reverberation synthesizer plotted against the tempo frequency. The curve 14 represents the output of a frequency-discriminative system, suitably amplified. The "largo" and "presto" tempo-frequency waves of Fig. 5 illustratively produce respectively the amounts of reverberation control powers or voltages represented by the ordinates 15 and 16.

Figs. 1 to 5 thus illustrate the steps 1a, 1b, 1c, 2, and 3 which were described above.

A schematic assembly of the entire equipment is shown in Figure 6. The reverberation synthesizer is shown schematically to comprise the telegraphone wire 21 which is suitably driven in the direction of the arrow, the cooperating recording head 18, and the reproducing (replica) heads 25 to 29. The latter are connected to a mixer device 30, the output from which may be impressed upon a frequency selective network 31. The output from 31 feeds energy to an amplifier 32 and thence to the general mixer 33. The connections and details of the synthesizer are fully described in my Patent No. 2,105,318 referred to above. The pick-up microphone 36, or other recording device, is connected to an amplifier 37 having incorporated therein a volume control device 38. The output circuit from the amplifier 37 may feed energy directly to a second amplifier 32' or optionally through a tone control device 39, and thence to the mixer 33. Output energy from the latter mixer may then be impressed upon a further amplifier 34 and thence to a utilization circuit which may include any sound reproducing device 35 or sound recorder. Part of the output of amplifier 37 is fed to the recording head 18 on the reverberation synthesizer. Another portion of the output of said amplifier is fed to a limiter 40 (corresponding to the action of Fig. 2). The limited output passes to a rectifier 41, giving the action shown in Fig. 3. The rectified output then passes through a low-pass filter 42 described above to derive a wave of the tempo frequency. This wave passes to a frequency-responsive circuit or frequency discriminator 43, wherein the control power or voltage is derived as indicated in Fig. 4, the action of filter 42 corresponding to that indicated in Fig. 5. The control power or voltage is then amplified in 44 and applied to suitable control mechanism 45 which through the intermediary of suitable means represented by the dash line 46 is adapted to automatically control the reverberation synthesizer, and which may also control, optionally, the tone control device 39 by suitable means represented schematically by the dash line 46'. The control means of the synthesizer, whereby the control output power of 44 is utilized, can be of any desired type, certain of which are disclosed in Figs. 7 to 10, now to be described.

In Figs. 7 and 8 I have shown an electromechanical arrangement for effecting automatic control of the reverberation synthesizer by adjustment of the replica head positions. At 47 there is shown the same mechanism disclosed in Fig. 5 of my Patent No. 2,105,318 for mechanically and manually adjusting the replica heads, except that the crank handle at the end of the drive shaft 48 has been replaced by a gear wheel 49. Cooperating with the latter is a toothed rack 50 which is guided for sliding movement by means of extensions 51 and 52 on either side thereof, movable within suitable bearings. The right hand rack extension 52 functions as the armature of a solenoid or electromagnet 53 which is connected to the output of the control amplifier 44. A restoring force (e. g., gravity or the tension of a stretched spring 54) acts against the pull of the electromagnet 53, thus establishing equilibrium positions for the movable system 50—52 and the thereto connected armature. Depending upon the amplitude or magnitude of the output control power or voltage in amplifier 44 the solenoid 53 will correspondingly be energized to adjust the replica head positions by way of the gear and rack 49 and 50 and the mechanism 47. More particularly, with increasing tempo frequencies as obtained in music ranging from largo to presto, the above arrangement is designed to adjust the replica heads closer and closer together so that diminishing reverberation effects are obtained as desired. It may also vary the settings of the tone control 39 or other controls as previously described.

A second modification is shown in Fig. 9 where the several replica heads or certain combinations thereof are switched in or out by means of relays under the control of the control amplifier. Although there are shown for convenience but 4 such heads, any desired number may be employed. Associated with the respective replica heads 25, 26, 27, etc., are the relays 55, 56, 57, etc., which are connected to the output of the control amplifier 44. The armature 58 of relay 55 is adapted by means of the spring 61 to normally close the circuit of the replica head 25. Similarly the armatures 59, 60, etc., of relays 56 and 57 are adapted by means of the spring 62 and 63 to normally close the respective circuits for replica heads 26 and 27. The springs 61, 62, 63, etc., have progressively decreasing spring tensions so that as the power output from amplifier 44 is increased the replica heads will be switched out of circuit, beginning with the replica head that is most remote from the recording head 18.

Assuming that the reverberation synthesizer is equipped with 5 replica heads and that music of largo tempo is being reproduced or recorded, all 5 heads will contribute toward the production of reverberation, since as will be seen from the curve of Fig. 4 the reverberation control power for this tempo is low, and the energization of the relays 55, 56, etc., will be insufficient to attract their armatures in opposition to their springs to open the replica head circuits. However, with an increase in the tempo the control power will increase with the result that progressively, first the 5th replica head, then the 4th, the 3rd, etc., will become ineffective by being open-circuited thereby reducing reverberation. This is brought about by the fact that the armatures are operated to an open-circuited position by their respective relays in sequence depending upon the spring tension of the armature springs 61, 62, etc.

Alternatively, if desired the spring tensions of the armature springs may be so chosen that with a "largo" rendition (with which high reverberation is desirable) the 1st, 3rd and 5th replica heads are operative, whereas with a "presto" rendition (with which low reverberation is desirable) the 1st, 2nd and 3rd replica heads are operative.

A further modification involves an electronic "graded-switching" means, such as a sequence of progressively-biassed amplifiers, whereby the control-output-power increase (or decrease) progressively activates (or inactivates) a series of amplifiers in the output circuits of the various replica heads. This arrangement is schematically shown in Figure 10. The replica heads are 25, 26, 27 etc., and their respective amplifiers are shown at 64, 65 and 66, the outputs of which lead to the mixer 30. Cut-off biasses 67 to 69 are available in the grid circuits of the replica head amplifiers. However, the biasses 67 to 69 are not applied to their respective amplifiers unless and until a conducting path is made through the progressively-biassed amplifier tubes 70 to 72 to ground whereby the corresponding cut-off (or partial cut-off) biasses 67 to 69 are effectively applied to the respective grids of the amplifier tubes 64 to 66.

However, the "grading tubes" 70 to 72 do not all become conductive under the same conditions. The grid biasses 73 to 75 of these tubes are progressively graded so that an increase (illustratively) in the potential in the output of control amplifier 44 will first make tube 72 conducting, then tube 71, and so on. Thus, if "presto" corresponds illustratively to maximum output control power (as also shown in Figure 4), the tempo frequency of "presto" will cut-off the output of the later replica heads (e. g., 27, 28, etc.), giving minimum reverberation time. The output corresponding to "largo," on the other hand, will be insufficient to make any of the tubes 70 to 72 conductive and therefore all of the amplifiers of the replica heads will be active (that is, not biassed to cut-off) and therefore all replica heads will contribute to the final audio output with maximum reverberation time as desired. The procedure is practically instantaneous.

It will be understood that the circuit arrangement of Figure 10 is only one of many that can be used for the purpose, and that the invention contemplates the use of any form of progressive electronic control device whereby the output power in 44 controls the output of the replica heads progressively and in accord with the tempo frequency.

In Fig. 11 there is interposed between the recording head 18 and the first replica head 25, an "original" head 18' in order to compensate for any appreciable delay in the operation of the reverberation synthesizer (due, for example, to mechanical inertia of a motor-drive system). This is accomplished by withdrawing the "original" output not from amplifier 37 as in Fig. 6 (or recording head 18) but rather from the delay head 18'.

Inasmuch as the various component parts utilized in my above described system, such as the limiter, rectifier, filter, discriminator, amplifiers, mixer, etc. are well-known in the conventional art (e. g. radio, sound recording or reproducing), illustration and description of particular circuits therefor are not deemed necessary.

While I have shown and described certain preferred embodiments of the invention, it will be understood by those skilled in the art that modifications and changes may be made without departing from the spirit and scope of the invention.

What I claim is:

1. A method of control which consists in deriving the sub-audible tempo frequency of music or speech, and utilizing the derived tempo frequency for control purposes.

2. A method of control which consists in deriving the tempo frequency of music or speech, producing an energy output related to the derived tempo frequency, and utilizing said energy output for control purposes.

3. A method for the derivation of musical or speech tempo which comprises passing electrical energy stemming from the music or speech through an electrical network selectively responsive to sub-audible frequencies, and indicating the output energy thereof.

4. A method as defined in claim 3 above, and including the steps of limiting and rectifying the electrical energy prior to its passage into said electrical network.

5. In a synthetic reverberation producing system, the method of automatically controlling reverberation in relation to musical tempo which consists in the step of deriving an indication related to the tempo frequency of the music.

6. In a synthetic reverberation producing system, the method of automatically controlling reverberation in relation to musical tempo, which consists in deriving the tempo frequency of the music, producing an energy output related to the derived tempo frequency, and actuating the controls of said reverberation synthesizer by said energy output.

7. The combination with a reverberation synthesizer in which discrete delayed electrical waves are mixed with an original wave which is desired to be reproduced with varying amounts of reverberation, of means for deriving from the original wave a frequency indicative of the tempo of said wave, means for translating the tempo frequency into control power, and means utilizing the control power for the automatic control of the reverberation synthesizer.

8. A sound wave synthesizer for use in connection with a source of sound, comprising means for converting sound waves from said source into electrical waves, means for recording said electrical waves, means for repeating the recorded waves a plurality of times, each time with a different delay constant, means for automatically controlling the different delay constants so as to simulate echo effects, and means for combining and reproducing the repeated waves and the original wave.

9. A sound wave synthesizer in accordance with the invention defined in claim 8, wherein the original electrical waves to be combined with the repeated waves are withdrawn from an auxiliary recording means which repeats the original wave after a predetermined delay in order to compensate for the delay in the action of the synthesizer control means.

10. A reverberation synthesizer comprising means for producing from a source of sound waves electrical waves corresponding thereto, a plurality of devices each adapted to derive and reproduce a differently delayed replica wave, the extent to which said replica waves are delayed determining the amount of reverberation to be produced by the synthesizer, means for combining and utilizing the original and delayed replica waves, and means under the control of the original electrical waves for automatically controlling the operation of said replica wave reproducing devices, whereby the original sound waves are reproduced with varying amount of reverberation.

11. A reverberation synthesizer as defined in claim 10 wherein the automatically controlled means operates to control the operation of predetermined ones of said replica wave reproducing devices.

12. A reverberation synthesizer as defined in claim 10 wherein the automatically controlled means operates to control the delay periods of said replica wave reproducing devices.

13. A sound wave synthesizer for use in connection with a source of sound, comprising means for converting sound waves into electrical waves, means operable contemporaneously with the first said means for repeating the electrical waves a plurality of times, each time with a different delay constant, means responsive to the original electrical waves for automatically and variably controlling the different delay constants so as to simulate echo effects in auditoriums of different sizes, and means for combining in controlled amplitudes the repeated waves and the original wave.

14. A synthetic reverberation producing system, comprising a source of electrical waves corresponding to a train of relatively non-reverberant sound waves, means for recording the electrical waves, means for repeating the electrical waves a plurality of times contemporaneously with the recording thereof, each time with a delay constant corresponding to a desired echo effect, means for combining the original waves with the repeated waves, means responsive to the original wave for automatically controlling the phase relationships between the original and the repeated waves, and means for utilizing the resultant of the combined waves by way of simulating the sound effects that would obtain if said source of electrical waves had originally included reverberation effects.

15. A synthetic reverberation producing system, comprising a microphone, an electrical transmission system connected to said microphone, recording apparatus operable under control of an original wave train generated in said transmission system, means for producing a plurality of delayed electrical wave trains corresponding to the original wave train, means for combining the delayed wave trains in controlled amplitudes with the original wave train, means for deriving from the original wave train a frequency indicative of the tempo of said wave train, means for translating the tempo frequency into a control power, and means utilizing the control power for varying automatically the time of delay of the different wave trains.

16. A synthetic reverberation producing system in accordance with the invention defined in claim 15 wherein the means for deriving the tempo frequency comprises a channel through which a portion of the original wave train energy is transmitted, said channel including a limiter for limiting the amplitude of the original wave, means for rectifying the limited wave, and a low pass filter coupled to the rectifying means for deriving the tempo frequency from the rectified wave.

17. A synthetic reverberation producing system in accordance with the invention defined in claim 15 wherein the means for translating the tempo frequency into a control power comprises a frequency discriminative network.

18. A synthetic reverberation producing system in accordance with the invention defined in claim 15 wherein the delayed electrical wave trains are produced by a series of spaced telegraphone pick-up heads, and the control power utilization means comprises electro-mechanical means cooperatively related with said pick-up heads for adjusting the space therebetween in accordance with the tempo frequency.

19. A synthetic reverberation producing system in accordance with the invention defined in claim 15 wherein the delayed electrical wave trains are produced by a series of pick-up heads, and the control power utilization means comprises a plurality of relays operated by the control power to selectively switch in or out predetermined ones of said pick-up heads.

20. A synthetic reverberation producing system in accordance with the invention defined in claim 15 wherein the delayed electrical wave trains are produced by a series of pick-up heads, and the control power utilizations means comprises a progressive electronic control device whereby the output power controls the output of the pick-up heads progressively and in accord with the tempo frequency.

ALFRED N. GOLDSMITH.